US010553027B1

(12) United States Patent
Yang (10) Patent No.: US 10,553,027 B1
(45) Date of Patent: **\*Feb. 4, 2020**

(54) SYSTEMS AND METHODS FOR NAVIGATING A USER IN A VIRTUAL REALITY MODEL

(71) Applicant: Ke.com (Beijing) Technology Co., Ltd, Beijing (CN)

(72) Inventor: Yuke Yang, Beijing (CN)

(73) Assignee: KE.COM (BEIJING) TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/581,741

(22) Filed: Sep. 24, 2019

Related U.S. Application Data

(63) Continuation of application No. 16/421,472, filed on May 24, 2019, now Pat. No. 10,467,810.

(30) Foreign Application Priority Data

May 30, 2018 (CN) .......................... 2018 1 0540326

(51) Int. Cl.
*G06T 19/00* (2011.01)
*G06Q 50/16* (2012.01)

(52) U.S. Cl.
CPC ......... *G06T 19/003* (2013.01); *G06Q 50/163* (2013.01); *G06T 2210/21* (2013.01)

(58) Field of Classification Search
CPC . G06F 3/04842; G06F 3/017; H04N 21/2393; G06T 2207/20104; G06T 19/003; G06T 2210/21; G06Q 50/163
See application file for complete search history.

(56) References Cited

U.S. PATENT DOCUMENTS 9,513,123 B2 12/2016 Heo et al.
2007/0198178 A1 8/2007 Trimby et al.
(Continued)

FOREIGN PATENT DOCUMENTS

| CN | 105333882 A | 2/2016 |
|---|---|---|
| CN | 105898712 A | 8/2016 |
| TW | 201741625 A | 12/2017 |

OTHER PUBLICATIONS

First Office action issued in counterpart Chinese Application No. 2018105403261, dated Apr. 3, 2019, 6 pages.
(Continued)

*Primary Examiner* — Haixia Du
(74) *Attorney, Agent, or Firm* — Bayes PLLC (57) ABSTRACT

Systems and methods for navigating a user in a three-dimensional model of a property are disclosed. An exemplary system includes a storage device configured to store data associated with a plurality of point positions. Each point position corresponds to a camera position at which images of the property are captured by the camera. The system further includes at least one processor configured to determine connectivity among the point positions and determine a plurality of candidate routes connecting a first introduction position and a second introduction position. Each candidate route links a subset of the point positions based on the connectivity. The at least one processor is further configured to select a route from the candidate routes and sequentially display views corresponding to the point positions on the selected route. The views at each point position are rendered from the images captured at the camera position corresponding to the point position.

17 Claims, 7 Drawing Sheets

(56) References Cited

U.S. PATENT DOCUMENTS

2015/0120600 A1  4/2015  Luwang et al.
2018/0149481 A1  5/2018  Hirai
2019/0020817 A1  1/2019  Shan et al.

OTHER PUBLICATIONS

Second Office action issued in related Chinese Application No. 201810540326.1, dated Jul. 8, 2019, 17 pages including English translation.

SYSTEMS AND METHODS FOR NAVIGATING A USER IN A VIRTUAL REALITY MODEL

RELATED APPLICATIONS

This application is a continuation of U.S. application Ser. No. 16/421,472, filed on May 24, 2019, which claims the benefits of priority to Chinese Application No. CN201810540326.1 filed on May 30, 2018, the content of which is hereby incorporated by reference in its entirety.

TECHNICAL FIELD

The present disclosure relates to systems and methods for conducting a property tour using virtual reality technology, and more particularly, to systems and methods for navigating a user in a three-dimensional model of a property through a selected route linking a plurality of point positions.

BACKGROUND

In the real estate market, when a person wants to buy or rent a property, he typically would ask to tour the property first in order to visually experience the layout and furnishing. House tours are often conducted in person. e.g., by the property owner or a real estate agent. During the tour, the visitor gets to see the property and the property owner/agent accompanying the tour will introduce features of the property to the visitor. For example, when the visitor is in the kitchen, features such as size of the room, cabinet and counter space, installed appliances, and lighting conditions may be introduced orally. While property tours are informative to the potential buyer/renter, it is also time consuming and inefficient.

Recently, Virtual Reality (VR) technology has been applied to conduct these tours virtually. Videos, images, and point cloud data of the property are taken in advance. A three-dimensional model is rendered based on the point cloud data and/or the images. As a result, a visitor can remotely view the property without having to do it in person. On the other hand, the property owner/agent may log into the system to introduce the property features in real-time. VR tours thus save both visitor and property owner/agent's time by recreating the in-person experience virtually online.

However, challenges remain in VR tours. In particular, a property typically includes multiple rooms or functional spaces, such as kitchen, living room, dining room, breakfast nook, study, bedrooms, and bathrooms. When the visitor finishes touring the current room and would like to view the next room, conventional VR touring technologies typically transitions the views directly from one room to another room, for example by suddenly switching the images. Such a transition contradicts the user experience in real life, where the visitor would have been ushered into the next room. For example, as he walks through the hallway and doors connecting the rooms, he would have continued to experience the layout of the property, as well as additional property views along the way. All these become lost due to the abrupt transition by the conventional VR touring technologies.

Embodiments of the disclosure improve the existing VR touring systems and methods by navigating a user in a three-dimensional model of a property through a selected route linking a plurality of point positions.

SUMMARY

In one aspect, a system for navigating a user in a three-dimensional model of a property is disclosed. The system includes a storage device configured to store data associated with a plurality of point positions. Each point position corresponds to a camera position at which images and point cloud data of the property are captured by the camera. The system further includes at least one processor configured to determine connectivity among the point positions and determine a plurality of candidate routes connecting a first introduction position and a second introduction position. Each candidate route links a subset of the point positions based on the connectivity. The at least one processor is further configured to select a route from the candidate routes and sequentially display views corresponding to the point positions on the selected route. The views at each point position are rendered from the images captured at the camera position corresponding to the point position.

In another aspect, a computer-implemented method for navigating a user in a three-dimensional model of a property is disclosed. The method includes receiving data associated with a plurality of point positions. Each point position corresponds to a camera position at which images of the property are captured by the camera. The method further includes determining, by at least one processor, connectivity among the point positions and determining, by the at least one processor, a plurality of candidate routes connecting a first introduction position and a second introduction position. Each candidate route links a subset of the point positions based on the connectivity. The method also includes selecting, by the at least one processor, a route from the candidate routes and sequentially displaying, on a display, views corresponding to the point positions on the selected route. The views at each point position are rendered by the at least one processor from the images captured at the camera position corresponding to the point position.

In yet another aspect, a non-transitory computer-readable medium having stored thereon computer instructions is disclosed. The computer instructions, when executed by at least one processor, perform a method for navigating a user in a three-dimensional model of a property. The method includes receiving data associated with a plurality of point positions. Each point position corresponds to a camera position at which images of the property are captured by the camera. The method further includes determining connectivity among the point positions and determining a plurality of candidate routes connecting a first introduction position and a second introduction position. Each candidate route links a subset of the point positions based on the connectivity. The method also includes selecting a route from the candidate routes and sequentially displaying views corresponding to the point positions on the selected route. The views at each point position are rendered from the images captured at the camera position corresponding to the point position.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
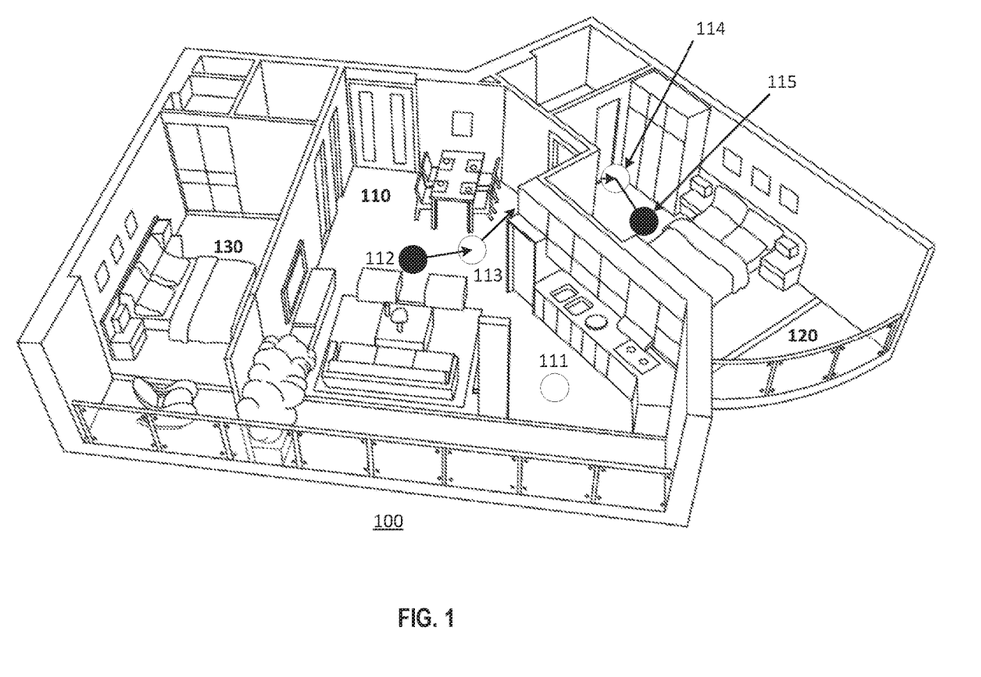
FIG. 1 illustrates a schematic diagram of an exemplary three-dimensional model including multiple rooms, according to embodiments of the disclosure.

FIG. 1 illustrates a schematic diagram of an exemplary three-dimensional model 100 including multiple rooms, according to embodiments of the disclosure. In some embodiments, three-dimensional model 100 may be a model of a property, such as a house, an apartment, a townhouse, a garage, a warehouse, an office building, a hotel, and a store, etc. As shown in FIG. 1, three-dimensional model 100 virtually recreates the real-world property including its layout (e.g., the framing structures that divide the property into several rooms such as walls and counters), finishing (e.g., kitchen/bathroom cabinets, bathtub, island, etc.), fixtures installed (e.g., appliances, window treatments, chandeliers, etc.), and furniture and decorations (e.g., beds, desks, tables and chairs, sofas, TV stands, bookshelves, wall paintings, mirrors, plants, etc.)

Figure 2:
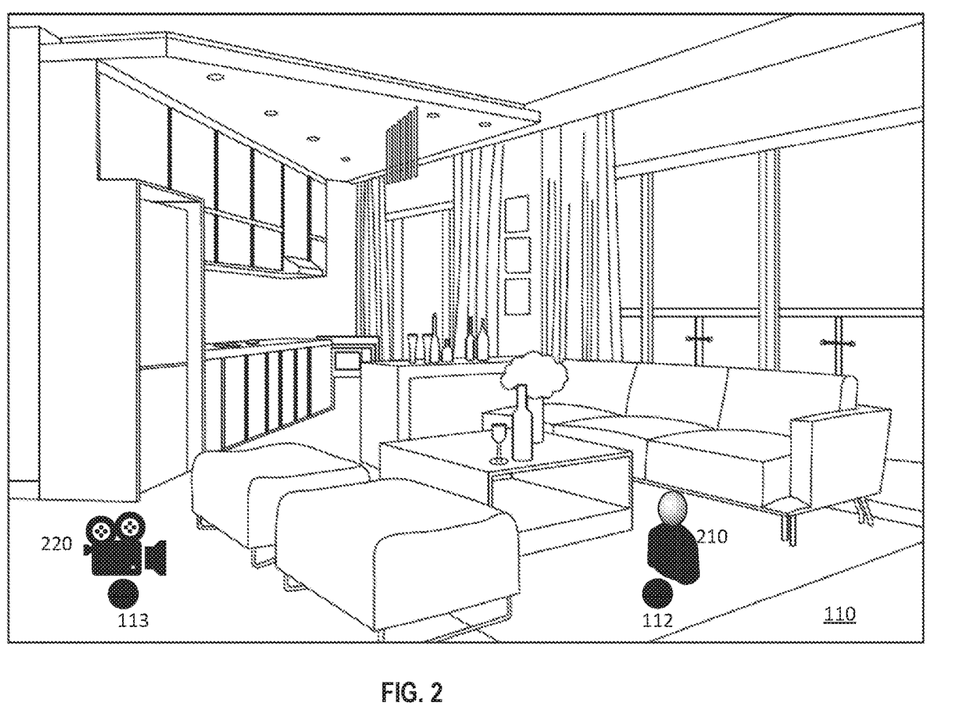
FIG. 2 illustrates a schematic diagram of an exemplary room in a three-dimensional model, according to embodiments of the disclosure.

Three-dimensional model 100 may be divided into multiple rooms or functional spaces by interior walls. Some rooms may have multiple functions. For example, three-dimensional model 100 may include a great room 110 that has combined functions of a living room and a kitchen. Three-dimensional model 100 may further include two bedrooms 120 and 130, their attached bathrooms, as well as balconies. FIG. 2 illustrates a schematic diagram of an exemplary great room 110 in three-dimensional model 100, according to embodiments of the disclosure. The rooms may be connected by hallways and doors.

Each room of three-dimensional model 100 includes at least one introduction positions. For example, great room 110 has an introduction position 112 and bedroom 120 has an introduction position 115. Consistent with the present disclosure, a "introduction position" is a position in the three-dimensional model that corresponds to a physical position that the user would stand in the room when listening to introductions by the property owner/agent. In other words, the user of the VR tool views the rooms from the introduction positions. In some embodiments, audio content may be displayed to the user at the introduction positions to orally introduce the features of the respective rooms. The introduction may be provided in real-time by property owner/agent, or pre-recorded and replayed when the user is at the introduction position.

Several point positions may be located within each room of three-dimensional model 100. For example, point positions 111 and 113 are located in great room 110, and point position 114 is located in bedroom 120. Consistent with the present disclosure, a "point position" is a position in the three-dimensional model that corresponds to a camera position where images and videos of the property are captured. In some embodiments, introduction positions 112 and 115 may also be point positions.

As shown in FIG. 2, a user 210 may be placed at introduction position 112 in great room 110 for the room features to be introduced to him. User 210 may view images or videos of great room 110 and listen to oral introductions at introduction position 112. A camera 220 may be placed at point position 113 and/or 112 to capture images and/or videos of great room 110. In some embodiments, camera 220 may be a digital camera, a binocular camera, a video camera, a panoramic camera, etc. In some embodiments, camera 220 may be configured to capture three-dimensional information, (e.g., including depth information) of the room. Camera 220 may be mounted on a tripod or be carried by an operator. Camera 220 may be rotated or otherwise adjusted to capture images or videos from different angles and heights.

In some embodiments, the VR tool may transition from one room to another room of three-dimensional model, during the VR house tour. For example, when user 210 finishes touring great room 110, he may want to move on to bedroom 120. Consistent with the present disclosure, systems and methods for navigating user 210 in three-dimensional model 100 of a property (e.g., from great room 110 to bedroom 120) is provided. Instead of transitioning from views at introduction position 112 in the first room directly to views at introduction position 115 in the second room, the disclosed systems and methods navigate user 210 from introduction position 112 to introduction position 115 along a route that passes one or more point positions, e.g., point positions 113 and 114. In some embodiments, the disclosed systems and methods selects the route from multiple candidate routes. The candidate routes are different paths that the user can follow to get from introduction position 112 in great room 110 to introduction position 115 in bedroom 120. Each candidate passes different sets of point positions.

In some embodiments, the disclosed systems and methods first determine connectivity among the relevant point positions and then establish the candidate routes connecting the introduction positions 112 and 115 by linking a set of the point positions that are determined to be connectable. The disclosed systems and methods then select the best route from the candidate routes based on certain criteria. Views corresponding to the point positions on the selected route may be sequentially displayed to the user to provide a more real experience as the user walks from great room 110 to introduction position 115 through the route. In some embodiments, the views at each point position are rendered from the images previously captured at the camera position corresponding to the point position. In some embodiments, the views are oriented in the direction the user is facing as he walks towards each point position. For example, the user may be facing the direction pointing from introduction position 112 to point position 113, and thus the views at point position 113 will be rendered in that direction when shown to the user.

Although the exemplary three-dimensional model shown in FIG. 1 illustrates only indoor space and structures, it is contemplated that the model could also include outdoor space and structures, such as the deck, the front/back yard, the garage, as well as the neighboring environment. A user may be navigated from an introduction position indoor to an introduction outdoor or from an introduction position outdoor to an introduction indoor door through, e.g., doors. A person of ordinary skill can adapt the disclosed systems and methods without undue experimentation for outdoor showings.

Figure 3:
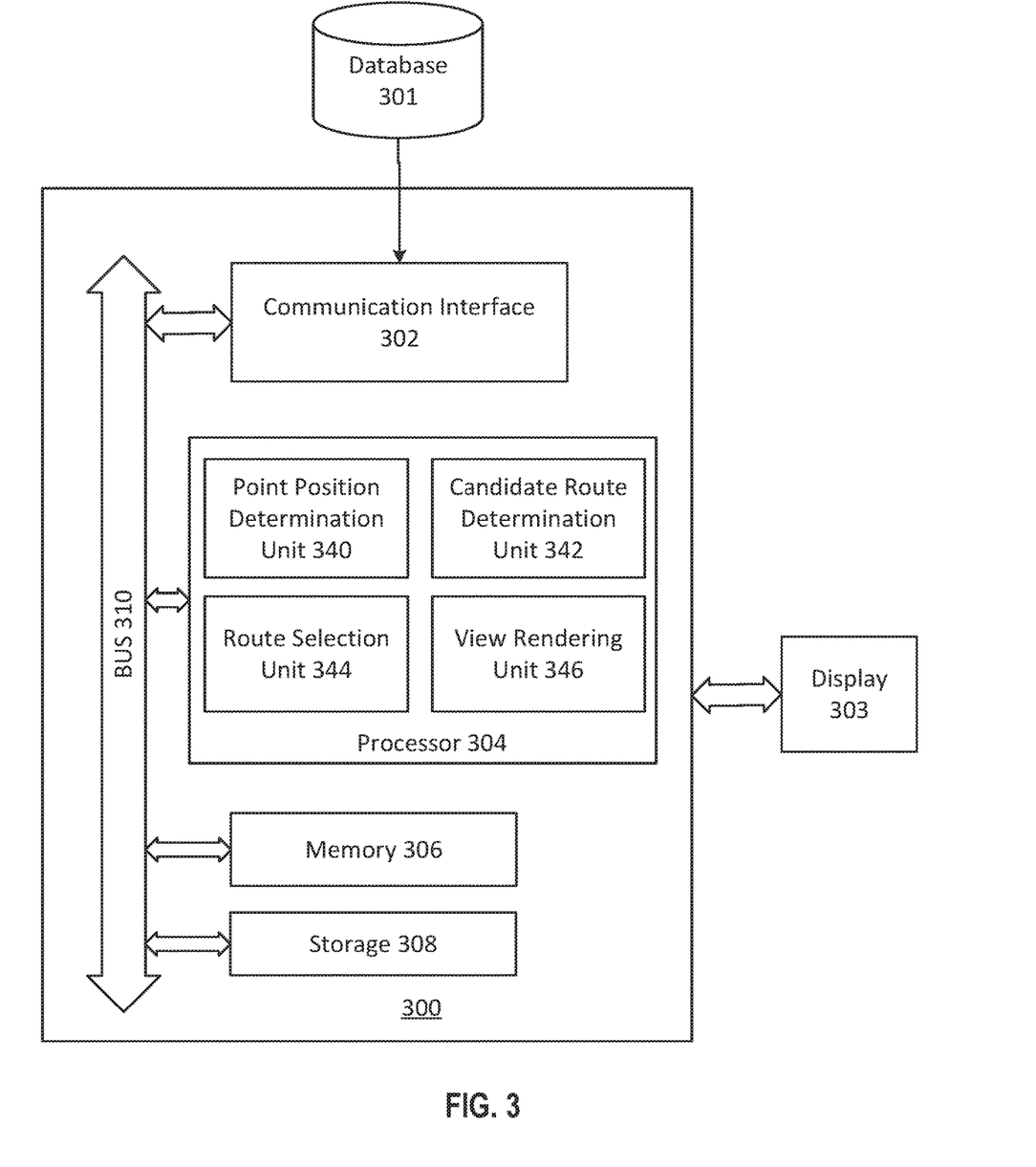
FIG. 3 is a block diagram of an exemplary system for navigating a user in a three-dimensional model, according to embodiments of the disclosure.

FIG. 3 is a block diagram of an exemplary system 300 for navigating a user in a three-dimensional model, according to embodiments of the disclosure. In some embodiments, system 300 may be implemented by a physical server or a service in the cloud. In some other embodiments, system 300 may be implemented a computer or a consumer electronic device such as a mobile phone, a pad, or a wearable device. As shown in FIG. 3, system 300 may include a communication interface 302, a processor 304, a memory 306, a storage 308, and a bus 310. In some embodiments, system 300 may have different modules in a single device, such as an integrated circuit (IC) chip (implemented as an application-specific integrated circuit (ASIC) or a field-programmable gate array (FPGA)), or separate devices with dedicated functions. Components of system 300 may be in an integrated device, or distributed at different locations but communicate with each other through a network (not shown). The various components of system 300 may be connected to and communicate with each other through bus 310.

Communication interface 302 may send data to and receive data from components such as camera 220 and database 301 via direct communication links, a Wireless Local Area Network (WLAN), a Wide Area Network (WAN), wireless communication networks using radio waves, a cellular network, and/or a local wireless network (e.g., Bluetooth™ or WiFi), or other communication methods. In some embodiments, communication interface 302 can be an integrated services digital network (ISDN) card, cable modem, satellite modem, or a modem to provide a data communication connection. As another example, communication interface 302 can be a local area network (LAN) card to provide a data communication connection to a compatible LAN. Wireless links can also be implemented by communication interface 302. In such an implementation, communication interface 302 can send and receive electrical, electromagnetic or optical signals that carry digital data streams representing various types of information via a network.

Consistent with some embodiments, communication interface 302 may receive a three-dimensional model of a property. The model may be constructed based on point cloud data as well as images captured of the property. In some embodiments, the three-dimensional model may be rendered in real-time of the VR tour or offline prior to the tour. Consistent with the disclosure, communication interface 302 may receive data of camera positions in the property, and images/videos of the property taken at those camera positions. The three-dimensional model, the camera positions, and the images/videos may be stored in database 301. Communication interface 302 may provide the received information or data to memory 306 and/or storage 308 for storage or to processor 304 for processing.

Processor 304 may include any appropriate type of general-purpose or special-purpose microprocessor, digital signal processor, or microcontroller. Processor 304 may be configured as a separate processor module dedicated to providing VR house tours. Alternatively, processor 404 may be configured as a shared processor module for performing other functions related to or unrelated to VR house tours. For example, VR house tour is just one application installed on a versatile device.

As shown in FIG. 3, processor 304 may include multiple modules, such as a point position determination unit 340, a candidate route determination unit 342, a route selection unit 344, and a view rendering unit 346, and the like. These modules (and any corresponding sub-modules or sub-units) can be hardware units (e.g., portions of an integrated circuit) of processor 304 designed for use with other components or to execute part of a program. The program may be stored on a computer-readable medium (e.g., memory 306 and/or storage 308), and when executed by processor 304, it may perform one or more functions. Although FIG. 3 shows units 340-346 all within one processor 304, it is contemplated that these units may be distributed among multiple processors located near or remotely with each other.

Memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform user navigation functions in a three-dimensional model disclosed herein. For example, memory 306 and/or storage 308 may be configured to store program(s) that may be executed by processor 304 to provide a VR tour of a property to a user by introducing property features to the user at introduction positions in a three-dimensional model and navigating the user in the model among the introduction positions.

Memory 306 and/or storage 308 may be further configured to store information and data used by processor 304. For instance, memory 306 and/or storage 308 may be configured to store various camera positions and images/videos of a property captured by camera 220 at the camera positions. Memory 306 and/or storage 308 may also be configured to store intermediate data generated by processor 304, such as point positions in a three-dimensional model corresponding to the camera positions, connectivity of the point positions, candidate routes connection two introduction positions, and rendered views at point positions. The various types of data may be stored permanently, removed periodically, or disregarded immediately after each frame of data is processed.

In some embodiments, system 300 may optionally include a display 303. In some embodiments, display 303 may be external to system 300 but be connected with system 300. Display 303 may display the views in the three-dimensional model to the users. In some embodiments, display 303 may further function as a user interface to receive user input. Display 303 may include a Liquid Crystal Display (LCD), a Light Emitting Diode Display (LED), a plasma display, or any other type of display, and provide a Graphical User Interface (GUI) presented on the display for user input and data display. The display may include a number of different types of materials, such as plastic or glass, and may be touch-sensitive to receive commands from the user. For example, the display may include a touch-sensitive material that is substantially rigid, such as Gorilla Glass™, or substantially pliable, such as Willow Glass™.

Figure 4:
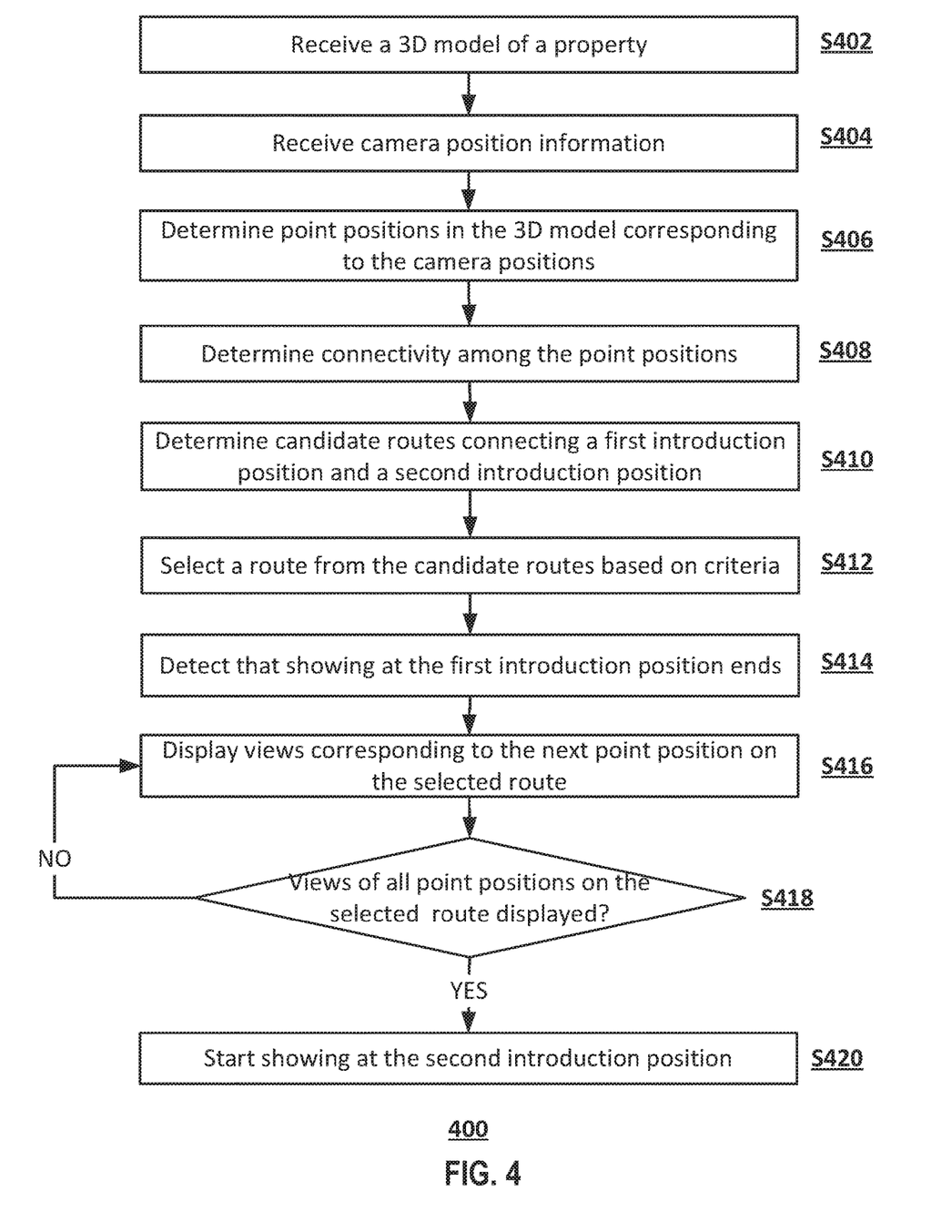
FIG. 4 is a flowchart of an exemplary method for navigating a user in a three-dimensional model, according to embodiments of the disclosure.

The modules of processor 304 may be configured to execute program(s) stored in memory 306/storage 308 to perform a method for providing a VR tour to a user. For example, FIG. 4 is a flowchart of an exemplary method 400 for navigating a user in a three-dimensional model, according to embodiments of the disclosure. Method 400 may include steps S402-S420 as described below. It is to be appreciated that some of the steps may be optional to perform the disclosure provided herein. Further, some of the steps may be performed simultaneously, or in a different order than shown in FIG. 4. For description purpose, method 400 will be described as to navigate a user from great room 110 to bedroom 120 of three-dimensional model 100 (as shown in FIG. 1). Method 400, however, can be implemented for navigating between other rooms of the model, between indoor and outdoor spaces, or for different models for the properties.

In some embodiments, method 400 may be triggered when system 300 receives an instruction to move the user from the current room to the next room. In some embodiments, system 300 may automatically initiate method 400 when it detects that the introduction of the current room is about to finish.

In step S402, communication interface 302 may receive a three-dimensional model of a property, such as three-dimensional model 100. In some embodiments, the three-dimensional model may be a model of a property, such as a house, an apartment, a townhouse, a garage, a warehouse, an office building, a hotel, and a store, etc. In some embodiments, the three-dimensional model may be constructed based on point cloud data of the property as well as image/videos captured of the property. The three-dimensional model may virtually recreate the property including its layout, finishing, fixtures, and furniture and decorations of the property.

In step S404, communication interface 302 may receive camera position information. For example, camera 220 may be placed in multiple positions in the property to take images and videos. In step S406, point position determination unit 340 may determine point positions in the three-dimensional model corresponding to the camera positions in the property. In some embodiments, the point positions are determined with a coordinate transformation of the camera positions. For example, coordinates of the camera positions may be transformed from the property coordinate system to the coordinate system of the three-dimensional model.

In step S406, point position determination unit 340 may be further configured to determine connectivity among the point positions. In some embodiments, two point positions are considered "connectable" if the connecting line between them does not intercept any obstacles in the three-dimensional model. In some embodiments, obstacles may include framing structures (e.g., walls and counters), furniture (e.g., table and chairs, sofas, beds), or other objects (e.g., plants). In some embodiments, the connectivity may be recorded in a two-dimensional table. For example, connectivity of two point positions may be recorded in a cell corresponding to the two point positions. In some embodiments, connectivity can be recorded as a binary number, with "1" corresponding to "connectable" and "0" corresponding to "non-connectable."

Figure 5:
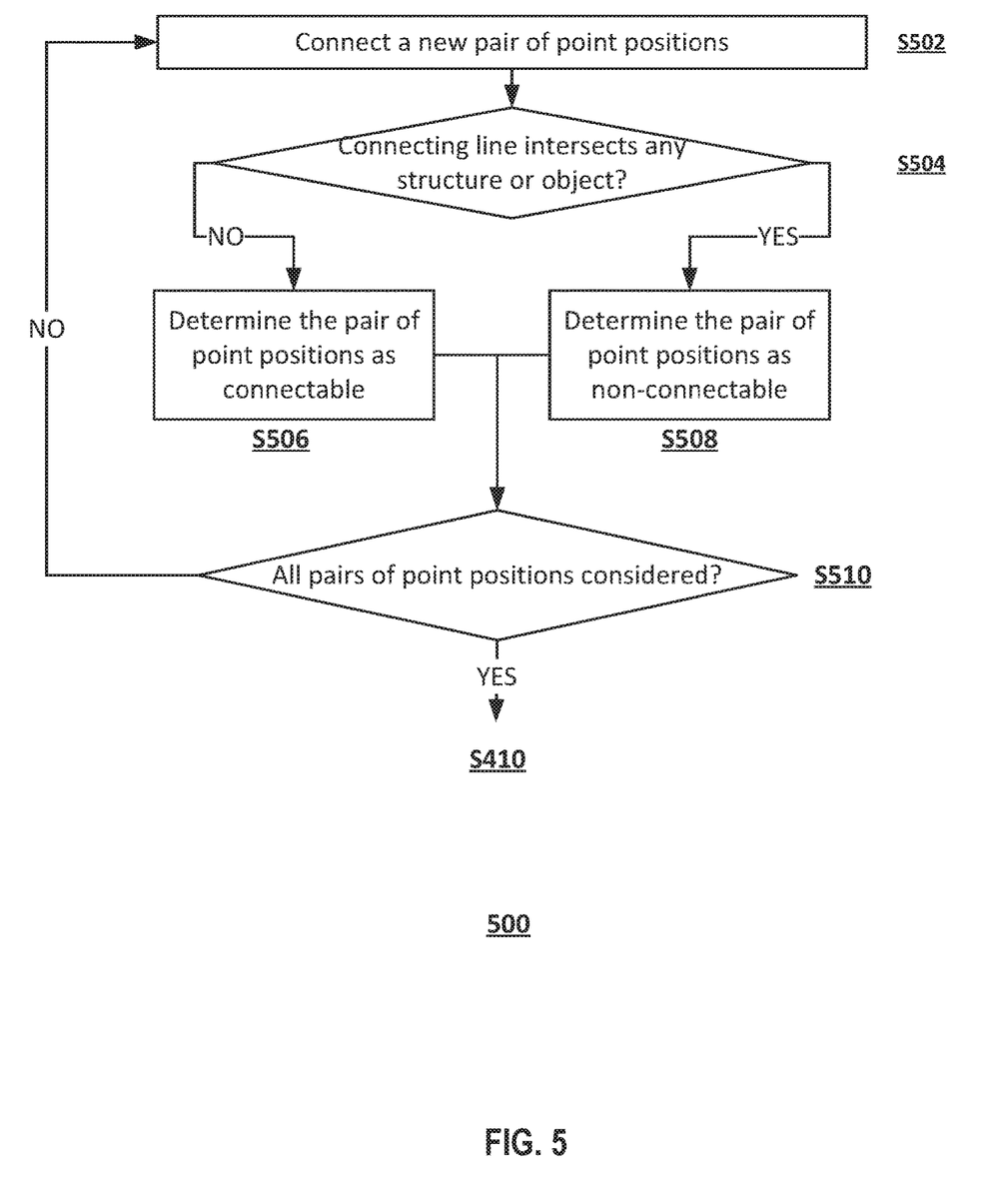
FIG. 5 is a flowchart of an exemplary method for determining connectivity among point positions, according to embodiments of the disclosure.

FIG. 5 is a flowchart of an exemplary method 500 for determining connectivity among point positions, according to embodiments of the disclosure. Method 500 may include steps S502-S512 as described below. It is to be appreciated that some of the steps may be optional to perform the disclosure provided herein. Further, some of the steps may be performed simultaneously, or in a different order than shown in FIG. 5. In some embodiments, the connectivity between two points positions may be determined based on the layout of the property. For example, the layout may specify the dividing structures, such as walls, counters, and doors. In some embodiments, the connectivity may be additionally determined based on other obstacles in the property, such as furniture, plants, and decorative pieces.

In step S502, point position determination unit 340 may connect a pair of point positions with a connecting line. In step S504, point position determination unit 340 may determine if the connecting line intersects any obstacle in the three-dimensional model. If no, the pair of point positions is determined to be connectable in step S506. Otherwise, the pair of point positions is determined to be non-connectable in step S508. For example, point positions 113 and 114 are connectable through a door. However, introduction positions 112 and 115 are not connectable because line connecting the two positions intersects with the wall.

In step S510, point position determination unit 340 may determine if all pairs of point positions are considered. If so, method 500 concludes and method 400 may proceed to step S410. Otherwise, method 500 will return to step S502 to consider the next pair of point positions, and determine the connectivity using steps S504-S508.

Figure 6:
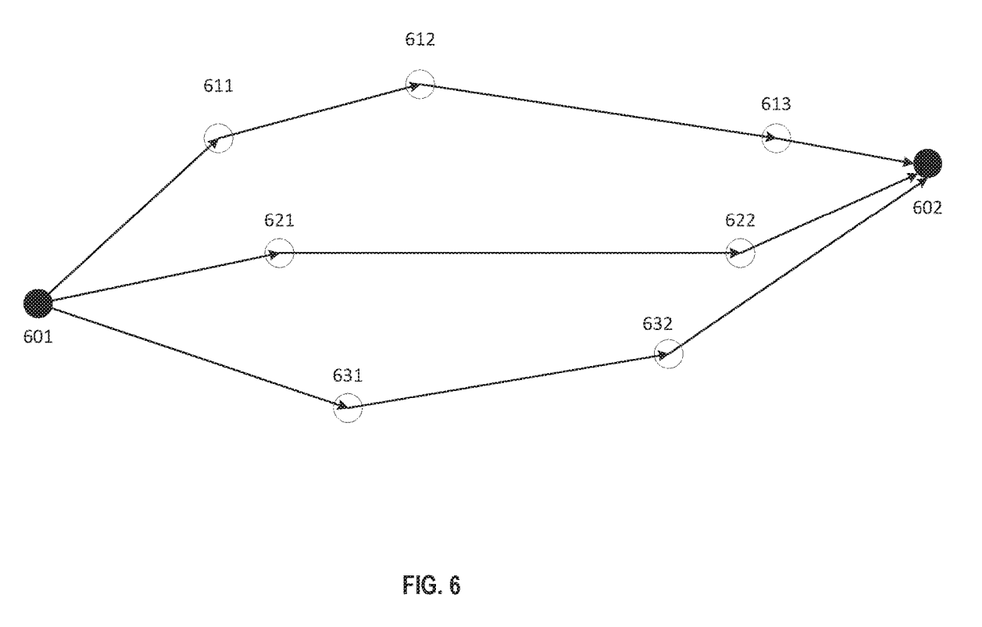
FIG. 6 illustrates exemplary candidate routes, according to embodiments of the disclosure.

Returning to FIG. 4, in step S410, candidate route determination unit 342 may determine candidate routes connecting a first introduction position and a second introduction position based on the connectivity. For example, the first introduction position may be introduction position 112 in great room 110, and the second introduction position may be introduction position 115 in bedroom 120. Each candidate route links point positions that are connectable. In some embodiments, multiple candidate routes between the first and second introduction positions may be available. For example, FIG. 6 illustrates exemplary candidate routes between introduction positions 601 and 602, according to embodiments of the disclosure. The first candidate route links point positions 611, 612, and 613. The second candidate route links point positions 621 and 622. The third candidate route links point positions 631 and 632.

Figure 7:
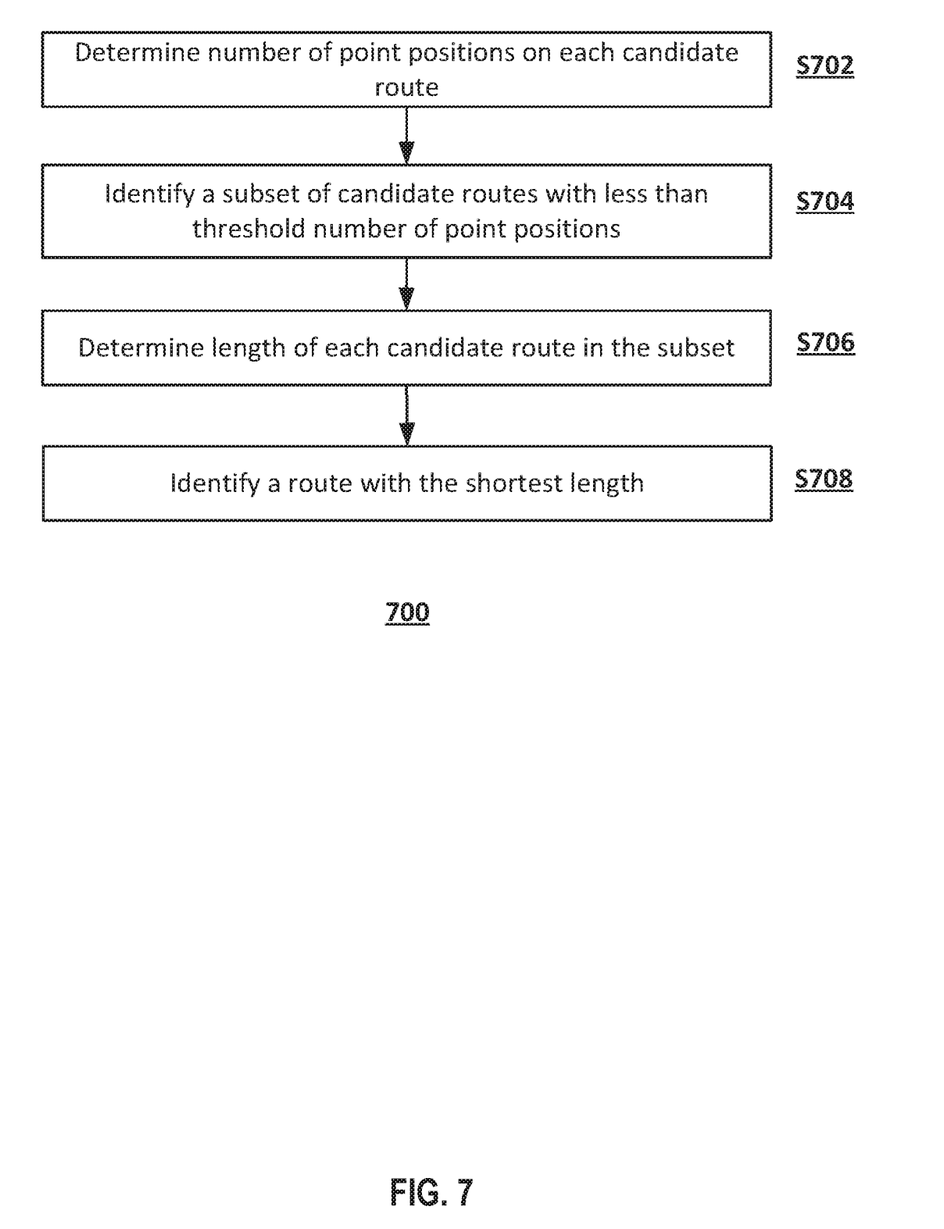
FIG. 7 is a flowchart of an exemplary method for selecting a route from candidate routes, according to embodiments of the disclosure.

In step S412, route selection unit 344 selects a route from the candidate routes based on some predetermined criteria. In some embodiments, the predetermined criteria may be that the number of point positions on the route is the smallest, and/or the length of the route is the shortest. For example, FIG. 7 is a flowchart of an exemplary method 700 for implementing step S412, according to embodiments of the disclosure. Method 700 may include steps S702-S708 as described below. It is to be appreciated that some of the steps may be optional to perform the disclosure provided herein. Further, some of the steps may be performed simultaneously, or in a different order than shown in FIG. 7.

In step S702, route selection unit 344 may determine the number of point positions on each candidate route. For example, as shown in FIG. 6, the first candidate route has three point positions between the first and second introduction positions. Both the second candidate route and the third candidate route have two point positions between the first and second introduction positions.

In step S704, route selection unit 344 may identify a subset of candidate routes with less than threshold number of point positions. For example, when the threshold number is 3, route selection unit 344 will identify the second and third candidate routes shown in FIG. 6. If after the thresholding, there is only one candidate route remaining, method 700 may conclude without implementing steps S706 and S708, and return the one candidate route as the selected route.

If more than one candidate routes remain after step S704, method 700 proceeds to step S706. In step S706, route selection unit 344 calculates the length of each candidate route in the subset. Consistent with the present disclosure, the "length" of a route is the accumulated distances between the point positions on the route. For example, in FIG. 6, if the distance L1 between introduction position 601 and point position 621, the distance L2 between point position 621 and point position 622, and the distance L3 between the point position 622 and introduction position 602, the length of the second candidate route is the sum of these distances, i.e., L=L1+L2+L3. Similarly, the length of the third candidate route can be calculated as L'=L1'+L2'+L3', where L1', L2', and L3' are the distances between the consecutive introduction/point positions 601, 631, 632, and 602.

In step S708, route selection unit 344 identifies the route with the shortest length. For example, if L<L', route selection unit 344 will identify the second candidate route as the best route.

It is contemplated that the two criteria may be applied in a flipped order, e.g., in step S704, the length of each candidate route may be compared with a threshold and those with lengths shorter than the threshold may be identified, and in step S706, the route with the smallest number of point positions may be selected from the remaining candidate routes. Other predetermined criteria may also be used to select the route. For example, in order to provide more seamless views when the user is being navigated to the second introduction position, route selection unit 344 may instead select the candidate route linking the largest number of point position. The selected route may be provided as the result of step S412, and method 700 concludes.

Returning to FIG. 4, in step S414, view rendering unit 346 may detect that showing at the first introduction position ends or is about to end, which indicates that the user will soon move to the next room. In some embodiments, showing of the property at the introduction positions may including displaying views rendered from images/videos captured at the camera positions corresponding the introduction positions. In some embodiments, showing of the property at the introduction positions may be further coupled with playing audio content to the user to introduce the room features. For example, the audio content may introduce features such as the size of the room, the function of the room, as well as other information such as when the room was renovated and the furniture and decorations in the room. In some embodiments, the audio content may be pre-recorded so that view rendering unit 346 knows when the replay is towards the end. In some embodiments, an indication that the user would like to view another room may be provided as an input by the user, e.g., by pressing buttons on the VR tool.

In step S416, view rendering unit 346 may render views corresponding to a point position on the selected route and display the views to the user. In some embodiments, the views may be rendered based on images/videos captured at the point position. In some embodiments, the views are rendered to be oriented in the direction the user is facing as he walks towards the next point position. For example, the user may be facing the direction pointing from introduction position 112 to point position 113, and thus the views at point position 113 will be rendered in that direction when shown to the user.

In some embodiments, view rendering unit 346 may sequentially render and display views for all the point positions between the two introduction positions. In step S418, view rendering unit 346 determines if views of all point positions on the selected route have been rendered and displayed. If so, method 400 proceeds to step S420. Otherwise, method 700 returns to step S416 to display views corresponding to the next point position on the selected route. Method 700 repeats steps S416 and S418 until all the views are displayed the user is navigated to the second introduction position.

In step S420, system 300 starts showing features of the next room at the second introduction position. For example, after views at point positions 113 and 114 are displayed, user 210 arrives at introduction position 115 in bedroom 120. The user will be shown views of bedroom 120 at introduction position 115, and audio content may be optionally played to the user.

By providing views at intermediate point positions between the two introduction positions, the disclosed systems and methods make the VR tour more closely mimic a real house tour, thus improving user experience.

Another aspect of the disclosure is directed to a non-transitory computer-readable medium storing instruction which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for navigating a user in a three-dimensional housing model of a property, comprising:
 a storage device configured to store data associated with a plurality of point positions, each point position corresponding to a camera position at which images of the property are captured by a camera; and
 at least one processor configured to:
 determine connectivity among the point positions;
 show the property at a first introduction position;
 automatically determine a second introduction position upon detecting that showing of the property at the first introduction position is ending;
 determine a plurality of candidate routes connecting the first introduction position and the second introduction position, and automatically select, for each candidate route, a subset of the point positions distinct from the first and second introduction positions based on the connectivity, each candidate route passing the selected subset of the point positions;
 select a route from the candidate routes; and
 sequentially display views corresponding to the point positions on the selected route, wherein the views at each point position are rendered from the images captured at the camera position corresponding to the point position.

2. The system of claim 1, wherein to determine the connectivity among the point positions, the at least one processor is further configured to:
 determine that a pair of point positions are not connectable if a connecting line connecting the pair of point positions intersects with at least one obstacle; and determine that the pair of point positions are connectable if the connecting line does not intersect with any obstacle.

3. The system of claim 1, wherein the property is a real estate property divided into a plurality of functional spaces, wherein the first introduction position is located in a first functional space and the second introduction position is located in a second functional space.

4. The system of claim 3, wherein the at least one processor is further configured to display audio content introducing the first functional space at the first introduction position and introducing the second function space at the second introduction position.

5. The system of claim 1, wherein to select the route from the candidate routes, the at least one processor is further configured to:
   determine a number of point positions on each candidate route; and
   keep a subset of candidate routes with the number of point positions less than a threshold number.

6. The system of claim 1, wherein to select the route from the candidate routes, the at least one processor is further configured to:
   determine distances between every two adjacent point positions on each candidate route;
   determine a length of each candidate route as a sum of the distances; and
   select the candidate route with a shortest length.

7. The system of claim 1, wherein to select the route from the candidate routes, the at least one processor is further configured to:
   determine a number of point positions on each candidate route; and
   select the route with the largest number of point positions the candidate routes.

8. The system of claim 1, wherein to sequentially display views corresponding to the point positions on the selected route, the at least one processor is configured to:
   navigate the user from a point position on the selected route to an adjacent point position on the selected route in a direction going from the first introduction position towards the second introduction position; and
   display the views corresponding to the adjacent point position orientated in the direction when the user is at the adjacent point position.

9. A computer-implemented method for navigating a user in a three-dimensional model of a property, comprising:
   receiving data associated with a plurality of point positions, each point position corresponding to a camera position at which images of the property are captured by a camera;
   determining, by at least one processor, connectivity among the point positions;
   showing the property at a first introduction position;
   automatically determining, by the at least one processor, a second introduction position upon detecting that showing of the property at the first introduction position is ending;
   determining, by the at least one processor, a plurality of candidate routes connecting the first introduction position and the second introduction position, and automatically selecting, for each candidate route, a subset of the point positions distinct from the first and second introduction positions based on the connectivity, each candidate route passing the selected subset of the point positions;
   selecting, by the at least one processor, a route from the candidate routes; and
   sequentially displaying, on a display, views corresponding to the point positions on the selected route, wherein the views at each point position are rendered by the at least one processor from the images captured at the camera position corresponding to the point position.

10. The computer-implemented method of claim 9, wherein determining the connectivity among the point positions further comprises:
    determining that a pair of point positions are not connectable if a connecting line connecting the pair of point positions intersects with at least one obstacle; and
    determining that the pair of point positions are connectable if the connecting line does not intersect with any obstacle.

11. The computer-implemented method of claim 9, wherein the property is a real estate property divided into a plurality of functional spaces, wherein the first introduction position is located in a first functional space and the second introduction position is located in a second functional space.

12. The computer-implemented method of claim 11, further comprising displaying audio content introducing the first functional space at the first introduction position and introducing the second functional space at the second introduction position.

13. The computer-implemented method of claim 9, wherein selecting the route from the candidate routes further comprises:
    determining a number of point positions on each candidate route; and
    keeping a subset of candidate routes with the number of point positions less than a threshold number.

14. The computer-implemented method of claim 9, further comprising:
    determining distances between every two adjacent point positions on each candidate route;
    determining a length of each candidate route as a sum of the distances; and
    selecting the candidate route with a shortest length.

15. The computer-implemented method of claim 9, wherein selecting the route from the candidate routes further comprises:
    determining a number of point positions on each candidate route; and
    selecting the route with the largest number of point positions among the candidate routes.

16. The computer-implemented method of claim 9, wherein sequentially displaying views corresponding to the point positions on the selected route further comprises:
    navigating the user from a point position on the selected route to an adjacent point position on the selected route in a direction going from the first introduction position towards the second introduction position; and
    displaying the views corresponding to the adjacent point position oriented in the direction when the user is at the adjacent point position.

17. A non-transitory computer-readable medium having stored thereon computer instructions, when executed by at least one processor, perform a method for navigating a user in a three-dimensional model of a property, wherein the method comprises:
    receiving data associated with a plurality of point positions, each point position corresponding to a camera position at which images of the property are captured by a camera;
    determining connectivity among the point positions;

showing the property at a first introduction position;
automatically determining a second introduction position upon detecting that showing of the property at the first introduction position is ending;
determining a plurality of candidate routes connecting the first introduction position and the second introduction position, and automatically selecting, for each candidate route, a subset of the point positions distinct from the first and second introduction positions based on the connectivity, each candidate route passing the selected subset of the point positions;
selecting a route from the candidate routes; and
sequentially displaying views corresponding to the point positions on the selected route, wherein the views at each point position are rendered from the images captured at the camera position corresponding to the point position.

* * * * *